(12) United States Patent
Carter et al.

(10) Patent No.: US 7,376,134 B2
(45) Date of Patent: May 20, 2008

(54) PRIVILEGED NETWORK ROUTING

(75) Inventors: Stephen R. Carter, Spanish Fork, UT (US); Lloyd Leon Burch, Payson, UT (US); Hashem Mohammad Ebrahimi, Salt Lake City, UT (US); Carolyn B. McClain, Springville, UT (US)

(73) Assignee: Novell, Inc., Provo, UT (US)

( * ) Notice: Subject to any disclaimer, the term of this patent is extended or adjusted under 35 U.S.C. 154(b) by 725 days.

(21) Appl. No.: 10/909,633

(22) Filed: Aug. 2, 2004

(65) Prior Publication Data
US 2006/0034179 A1 Feb. 16, 2006

(51) Int. Cl.
*H04L 12/56* (2006.01)

(52) U.S. Cl. ........................ 370/389; 370/392; 709/238

(58) Field of Classification Search ................ 370/389, 370/392, 412; 726/12; 709/238
See application file for complete search history.

(56) References Cited

U.S. PATENT DOCUMENTS

| 5,109,510 | A | 4/1992 | Baker et al. |
| 6,009,081 | A | 12/1999 | Wheeler et al. ............. 370/255 |
| 6,038,306 | A | 3/2000 | Spahl et al. ................. 379/209 |
| 6,055,236 | A * | 4/2000 | Nessett et al. ............... 370/389 |
| 6,401,129 | B1 | 6/2002 | Lenander |
| 6,577,723 | B1 | 6/2003 | Mooney |
| 6,654,381 | B2 * | 11/2003 | Dally et al. ................. 370/412 |
| 6,678,273 | B1 | 1/2004 | Brown ..................... 370/395.2 |
| 6,728,272 | B1 | 4/2004 | Hosein ........................ 370/539 |
| 6,738,814 | B1 | 5/2004 | Cox et al. .................... 709/225 |
| 6,842,772 | B1 | 1/2005 | Delaney et al. |
| 6,882,643 | B1 * | 4/2005 | Mauger et al. ............. 370/389 |
| 2002/0061011 | A1 * | 5/2002 | Wan ........................... 370/352 |
| 2002/0094081 | A1 * | 7/2002 | Medvinsky .................. 380/44 |
| 2002/0136204 | A1 | 9/2002 | Chen et al. |
| 2003/0061234 | A1 | 3/2003 | Ali et al. |
| 2003/0105800 | A1 | 6/2003 | Cullen |
| 2003/0179704 | A1 * | 9/2003 | Lakkakorpi ................. 370/230 |
| 2004/0268175 | A1 * | 12/2004 | Koch et al. .................... 714/4 |
| 2006/0005237 | A1 * | 1/2006 | Kobata et al. ................. 726/12 |

OTHER PUBLICATIONS

"European Search Report", European Search Report Received in EP05104253, (Nov. 9, 2005),3 pgs.
Kurzyniec, Dawid, et al., "On the Viability of Component Frameworks for High Performance Distributed Computing: A Case Study", ISBN: 0-7695-7686-6. *High Performance Distributed Computing, 2002.* HPDC-11 2002.,Proceedings, 11th IEEE International Symposium on Jul. 23-26, 2002, Piscataway, NJ, USA, IEEE. XP010601184,(Jul. 23, 2002),pp. 275-283.
Malawski, Maciej, et al., "MOCCA—Towards a Distributed CCA Framework for Metacomputing", ISBN: 0-7695-2312-9. *Parallel and Distributed Processing Symposium, 2005. Proceedings, IEEE International*, Denver, CO, USA, 04-08 April 2005, Piscataway, NJ, USA, XP010785717,(Apr. 4, 2005),8 pgs.

(Continued)

*Primary Examiner*—Hassan Kizou
*Assistant Examiner*—Jeffrey M Rutkowski
(74) *Attorney, Agent, or Firm*—Schwegman, Lundberg & Woessner, P.A.

(57) ABSTRACT

Techniques are provided for establishing privileged paths for data packets over a network. A data packet is received with a header; the header includes a route selector. The route selector assists in resolving a privileged path for the data packet. The data packet is injected into the network over the resolved privileged path.

13 Claims, 4 Drawing Sheets

OTHER PUBLICATIONS

Migliardi, Mauro, et al., "Heterogeneous Distributed Virtual Machines in the Harness Metacomputing Framework", ISBN: 0-7695-0107-9. Heterogeneous Computing Workshop, 1999. *HCW '99.*, Proceedings, Eighth San Juan, Puerto Rico Apr. 12, 1999, Los Alamitos, CA, USA, IEEE Comput. Soc., US, XP010333332, (Apr. 12, 1999),pp. 60-72.

Migliardi, Mauro, et al., "Standards Based Heterogeneous Metacomputing: The Design of Harness II", ISBN: 0-7695-1573-8. Parallel and Distributed Processing Symposium, *Proceedings International IPDPS 2002.*, Ft. Lauderdale, FL, USA Apr. 15-19, 2002, Los Alamitos, CA, USA, IEEE Comput; Soc. XP010591111,(Apr. 15, 2002),pp. 84-96.

Sunderam, Vaidy, et al., "Lighweight Self-Organizing Frameworks for Metacomputing", ISBN 0-7695-1686-6. High Performance Distributed Computing, 2002. HPDC-11 2002. *Proceedings, 11th IEEE International Symposium.*, Jul. 23-26, 2002, Piscataway, NJ. XP 0769516866,(Jul. 23, 2002),pp. 113-122.

* cited by examiner

PRIVILEGED NETWORK ROUTING

FIELD OF THE INVENTION

The invention relates generally to networking and more specifically to techniques for establishing privileged network routing of data.

BACKGROUND OF THE INVENTION

Networks are rapidly becoming overloaded and taxed with traffic from governments, organizations, and private individuals. In particular, the Internet is increasingly being used to conduct business, acquire information, and for leisure. Moreover, there have been recent governmental efforts made to ensure all participants within the United States have affordable access to high speed connectivity to the Internet. However, if every participant were to have a high speed connection to the Internet, then websites will become even more overtaxed and not be capable of supporting the increased speed with which transactions are received and processed.

As a result, organizations and Internet Service Providers (ISPs) have began selling high-end services, such as Virtual Private Networks (VPNs) to customers. A VPN ensures a dedicated port for traffic over a network for participants of the VPN, where traffic over that port is custom encrypted based on the participants to that VPN. The encryption provides an added enticement to customers, because it adds security aspects to transactions over the VPN. However, because ports are finite resources only so many VPNs can be realistically available. Moreover, the VPN encryption requires applications which must be supported on the client devices of the participants.

With the introduction of VPN and similar services, the Internet is rapidly becoming segmented into fast and secure networks for those that can afford it and legacy (slower) and insecure networks for those that cannot afford it. Furthermore, if VPNs are excessively deployed the Internet may begin to logically resemble a finite collection of dedicated networks, where fees are required to traverse across each separate dedicated network. This may actually hinder the true purpose of the Internet, which was to provide pervasive connectivity to services and information in an uninhibited manner. If tolls are required to proceed at various points of the Internet, then usage of the Internet will be severely inhibited.

Another problem, which has only strengthened the movement towards VPN solutions, is the increased threat of malicious inference with Internet traffic. That is, a network transaction may include sensitive information which can be maliciously grabbed or may be tainted with a virus that may damage resources that process the transaction. In fact, this problem has become so pervasive that governments, organizations, and individuals have invested heavily in devices and software to detect and prevent such behavior.

Even without VPNs, the Internet is rapidly becoming congested and there is a need for new private and privileged networks existing as sub-networks within the Internet. Such privileged networks would provide enhanced network service to organizations for effectively continuing to do business over the Internet by offering privileged routes over the Internet, which are reserved for selective subscribers. Therefore, there is a need for improved network transactions which offer alternatives to traditional VPN and related technologies and which provide privilege networks.

SUMMARY OF THE INVENTION

In various embodiments of the invention, techniques are presented for establishing privileged paths for data packets over a network. A data packet having a header is received. The header includes a detected route selector. The route selector identifies or resolves a privileged path for the data packet over a network. The data packet is injected into the network over the identified or resolved privileged path.

More specifically, and in an embodiment, a method for injecting a data packet into a network over a privileged path is described. A data packet is received from a source and a route selector is detected in a header of the data packet. In response to the route selector, a privileged path is acquired and the data packet is injected into the network over the privileged path.

DETAILED DESCRIPTION OF THE INVENTION

Figure 1:
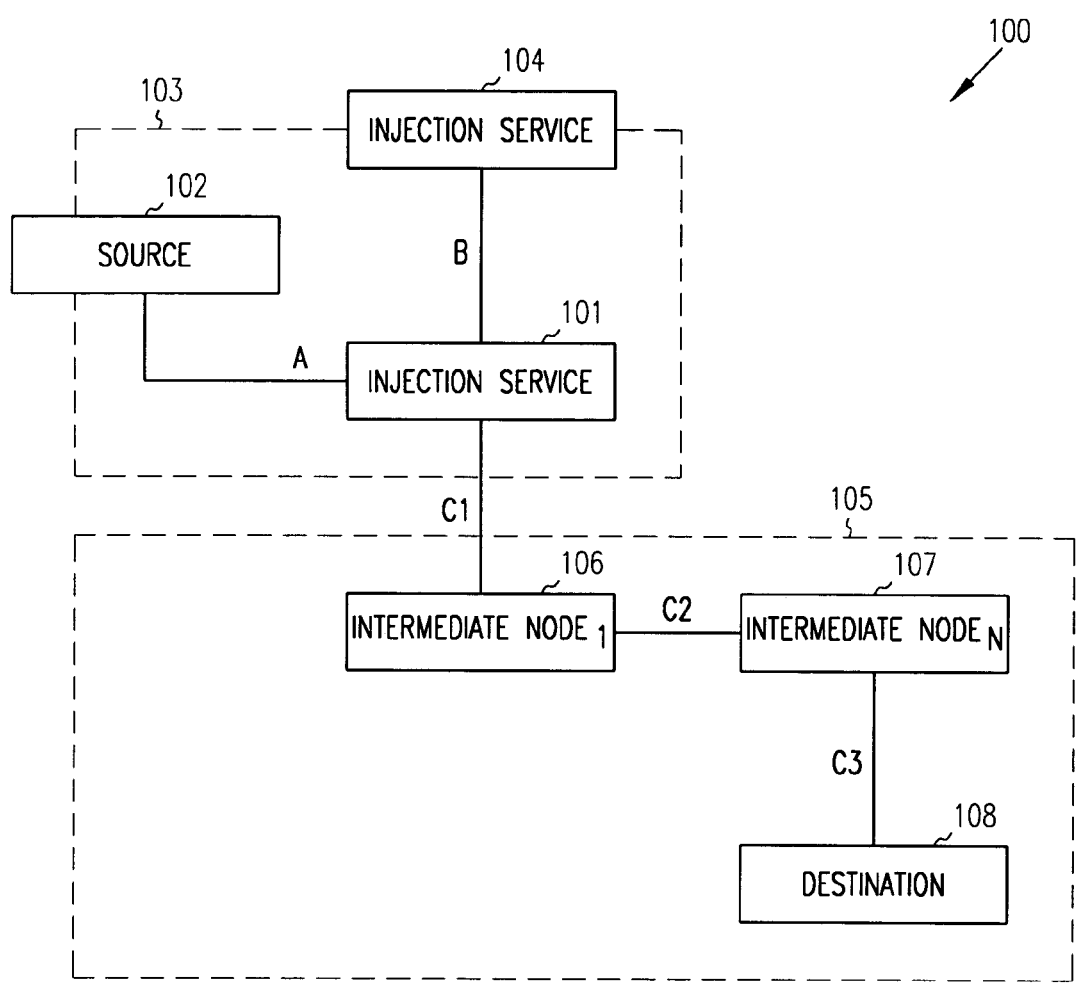
FIG. 1 is a diagram of an example architecture view of a privileged path injection system, according to an example embodiment of the invention.

In various embodiments of the invention, the term "path" is used. A path includes a plurality of network nodes. A node may be any network resource or processing device, such as a client, a server, a proxy, a mass storage device, etc. Nodes are connected via a network and interfaced with one another using a variety of protocols or interfaces, some interfaces are associated with hardware and some are associated with software. The interfaces may be layered, meaning that higher-level interfaces are used by applications or users interfacing on the nodes and are converted into a variety of other lower-level interfaces for purposes of performing a network transaction.

Further, each node may be interfaced to a variety of other processing devices and other LANs. The processing devices execute applications and a number of related applications cooperate to form systems. Any particular node can be designated as a source node, an intermediate node, or a destination within the network. A source node initiates a network transaction from one of its applications or systems executing on one of its processing devices. An intermediate node assists in relaying or forwarding a source node's transaction through the network to a destination node. Any particular network transaction may be handled by a multitude of intermediate nodes before it reaches its destination node. A destination node has the processing device, application, system, or storage medium that is the object of the source node's transaction.

The designation of a node within a network as a source, intermediate, or destination node is relative. This means that one node may receive a designation for one transaction and a different designation for another transaction. Typically, a node that initiates a network transaction will drive designations for the other participating nodes that will handle the transaction.

During a transaction over a network, the paths that the transaction may take can be viewed as a sub-network for that transaction. A path is a subset of nodes, connections, and/or resources that define how the transaction may move from the source node through zero or more intermediate nodes to the destination node.

A "privileged path" is a path that is processed by at least one node of the network in a special manner. That is, a node may designate and use reserved or special routing tables and/or ports to provide a higher priority to data packets associated with a privileged path. In this manner, a data packet associated with a privileged path receives priority processing throughput through the node that recognizes it. It should also be noted that not all nodes that process a data packet associated with a privileged path will receive or even be aware of the privileged path association to the data packet.

A network transaction includes a source node (hereinafter "source") that desires to transmit data over a network to a destination node (hereinafter "destination"). That data for the transaction is broken into a series of one or more data chunks called data packets for purposes of efficiently transmitting the entire block of data through a path of the network from the source to the destination. This process of breaking and sending the data as data packets for a given transaction is handled by conventional network protocols, such as, but not limited to Transmission Control Protocol (TCP), and others.

In various embodiments of the invention, an identity service is used. The identity service provides a trusted technique for authenticating resources participating in network transactions. The identity service may also provide identity information and authenticating mechanisms to resources, such that one resource can become trusted and authenticated to another resource. In this sense, the identity service is a trusted intermediary and facilitator to the resources of the network.

The identity service may also provide a variety of other services. Examples of an identity service can be found in: U.S. patent application Ser. Nos. 10/765,523 ("Techniques for Dynamically Establishing and Managing Authentication and Trust Relationships"), 10/767,884 ("Techniques for Establishing and Managing a Distributed Credential Store"), and 10/770,677 ("Techniques for Dynamically Establishing and Managing Trust Relationships"). These applications are commonly assigned to Novell, Inc. of Provo, Utah and the disclosures of which are incorporated by reference herein.

In one embodiment, the techniques presented herein are incorporated into network arrangements, services, and products, such as proxy services, routers, gateways, and the like. These techniques inject data packets associated with a network transaction into a network over a privileged path in the manners described herein and below.

FIG. 1 is an architectural diagram 100 of one privileged path injection system along with an example data packet flow through the injection system, according to an example embodiment of the invention. The injection system is implemented in a machine accessible and readable medium over a network within various resources of that network. A variety of network protocols, software, hardware, are also used during operation of the injection system. The injection system selectively identifies data packets and injects them into a network over privileged paths.

The architectural diagram 100 shows a variety of components that participate processing a data packet. The data packet moves through the injection system for a given network transaction. These components include an injection service 101, a source 102, a secure network 103, an identity service 104, an insecure network 105, one or more intermediate nodes 106 and 107, and a destination 108.

The source 102 and the injection service 101 are within a secure and potentially trusted relationship within a secure network 103. FIG. 1 shows the source 102 straddling the secure network 103 because in some instances the source 102 may enter the secure network 103 from a different insecure network (not shown in FIG. 1). That is, the source 102 may originate within the secure network 103 or may originate from a different network, in which case the source 102 authenticates itself and becomes a participant within the secure network 103.

For example, consider a source 102 that is a laptop that has traveled outside the secure network 103. Such a source 102 may use an insecure network, such as the Internet, to contact a firewall of the secure network 103, authenticate itself, and thereby become a temporary participant within the secure network 103. In an alternative example, the laptop may be docked within a LAN associated with the secure network and may become a participant to the secure network by simply logging into the secure network.

The injection service 101 is a proxy service, a router, a gateway, a switch, a hub, a bridge, etc. The source 102 may or may not be aware of the presence of the injection service 101. Additionally, the source 102 may itself be a proxy service, application, router, gateway, etc. Thus, the source 102 does not have to be the device used by a sender of a network transaction. That is, the sender may use an application or service on one device to initiate a network transaction, where that network transaction is sent to or intercepted by the source 102. The source 102 may also be aware or unaware of the injection service 101, such as when the source 102 directly processes the transaction to the injection service 101 or alternatively when the injection service 101 intercepts network transactions being processed by the source 102 to a desired destination 108.

When the source 102 is ready to transmit one or more data packets associated with the transaction to the injection service 101 via link A, the source 102 may perform a variety of operations. In some cases, as described above this may entail the source authenticating to the secure network 103. In one embodiment, this authentication occurs via an identity service 104, such as the identity service described above.

Once authenticated the source 102 acquires one or more route selectors for the transaction. A route selector is a piece of data (may be a data structure) that identifies a privileged path (C1, C2, and C3) over the network 105 for the transaction. Additionally, a route selector may include nested sub-route selectors associated with sub-privileged paths. Furthermore, a route selector may be a string of route selectors each associated with a different or complimentary privileged path over the network 105 from the source 102 to the destination 108.

In one embodiment, the source 102 acquires one or more route selectors from the identity service 104 after authentication to the secure network 103. That is, the identity service 104 manages distribution of route selectors based on identities of senders, sources 102, injection services 101, networks 105, and/or destinations 108. In another embodiment, an external service (not shown in FIG. 1) manages distribution of route selectors, such that the source 102 acquires information on how to authenticate to that external service via the identity service 104 and once authenticated requests the route selectors from the external service. In still other embodiments, the source 102 may itself have an embedded route selector management service that provides the route selectors to the source 102. In yet other embodiments, the injection service 101 may manage and distribute sets, lists, or individual route selectors to the source 102 for the source 102 to independently manage or use on a per-request basis.

Once the source 102 has one or more route selectors for the transaction that it is processing on behalf of a sender, each data packet associated with the transaction is associated with the route selector(s). Association can be achieved in a variety of manners via metadata associated with a data payload of the data packet. One technique is to modify a conventional TCP header (metadata) for a data packet by adding the route selector data to that header's options segment. By placing this information in the options segment normal and legacy TCP/IP operation for network protocols will not be impacted. Moreover, the only entity that is aware of the modified options segment and that will be looking for it is the injection service 101.

Optionally, the metadata may also include an identity for the source 102 or sender of the network transaction, a digital signature of the source 102 or sender, and/or other configurable keys or chains of keys established by policies. In one embodiment, the metadata also includes the identity for the source 102 and a digital signature of the source 102, where the digital signature includes the route selector data and a 32-bit TCP sequence number associated with the data packet (by including the 32-bit TCP sequence number man-in-the-middle attacks become essentially worthless). This additional metadata associated with the data packet provides security to the network transaction.

Once the metadata is configured by the source 102, it is associated with the data packet (e.g., as a data packet header) and sent to the injection service 101 over link A. In one embodiment, the packet is sent from the source 102 to the injection service 101 via traditional TCP/IP network communication. The injection service 101 strips the metadata and detects the presence of one or more route selectors and optionally security information (ids, signatures, and/or keys).

If the injection service 101 detects security information or by policy requires security information for the transaction, then the injection service 101 contacts the identity service 104 over link B for purposes of acquiring keys and/or satisfying itself that the transaction is legitimate. Accordingly, in one embodiment, the injection service 101 acquires a public certificate for the source 102 from the identity service 104. In one embodiment, the public certificate is cached by the injection service 101, such that it is available for subsequent privileged path processing associated with the source 102. Thus, in some cases, the injection service 101 does not have to contact the identity service 104, since the public certificate is pre-existing in cache. The public certificate permits the injection service 101 to validate a signature or other keys embedded in the metadata of the data packet sent from the source 102. If the security information is not verified then the injection service 101 can deny the transaction or ignore the request for a privileged path for the transaction and process the data packet with conventional routing tables and ports accessible to typical network transactions within the injection service 101. Optionally, the injection service 101 may also log and/or report any invalid attempts to acquire a privileged path for a network transaction.

If the security information is verified, when present and used, or not present when not used, then the injection service 101 strips the route selector(s) from the received data packet and acquires the privileged path(s) associated with the route selector(s) and sends the data packet and its privileged path(s) to reserved routing tables and ports accessible to the device processing the injection service 101. In one embodiment, a selective first portion of the privileged path is also stripped out by the injection service 101. The first portion is the link and node information associated with moving the data packet from the injection service 101 to a first intermediate node. This portion of the privileged path is no longer necessary, since the next receiving intermediate node of the data packet and the privileged path only needs its next portion of the privileged path. In this manner, stripping the route selectors and selective first portions of the privileged path ensures that the data packet includes only a minimal amount of needed metadata to process through the network. The data packet receives priority service from the injection service 101 and is processed more rapidly than conventional data packets would be handled by the injection service 101.

In one embodiment, for purposes of decreasing the size of the metadata associated with the data packet and improving processing throughput through the network 105, the injection service may also strip the route selector(s) and/or any included security information from the metadata before forwarding the data packet and its privileged path(s) to the reserved routing tables and/or port.

Once the data packet is sent to the reserved routing tables and/or port, it is injected into the network 105 from the injection service 101 over the privileged path (C1, C2, and C3) to the destination 108. The identifier for the intermediate node 107 is included in the privileged path and sent as metadata with the injected data packet. The identifier for intermediate node 106 is not needed and may be optionally stripped from the privileged path (C2 and C3) because the injection service 101 processes the data packet to the first portion of the privileged path (C1). Moreover, the intermediate nodes 106 and 107 do not need to be aware of the concept of the privileged path or the processing that took place with the source 102, the injection service 101, and the identity service 104 within the originating secure network 103.

In some embodiments, the injection service 101 may decide when a data packet that is validated and has a route selector is to receive a privileged path and determine dynamically which privilege path to provide the data packet. For example, the injection service 101 may use policies to decide that at certain times of the day or on certain calendar days a privileged path is provided to data packets.

Alternatively, configurable events or conditions, such as processing load may dictate whether a privileged path is even needed, even when one is requested. For example, a data packet may request via its metadata a privileged path, but the injection service 101 may detect that the normal routing tables and ports are grossly underutilized in comparison to the reserved routing tables and/or port associated with privileged path processing. In these situations, the injection service 101 by policies may elect not to provide a privileged path to the requesting data packet.

In another mode of operation, the source 102 or sender may be external to the secure network 103 and become part of the secure network via authentication through assistance of the identity service 104. In some cases, the connection used by such a source 102 or sender to authenticate to the secure network 103 can be a VPN.

It should also be noted, that the network 105 need not be an insecure Wide Area Network (WAN) such as the Internet in all embodiments of the invention. That is, in some embodiments, the network 105 is another secure network associated with an organization, such that the privileged path becomes a sub-network or overlay within the secure network 105.

Furthermore, in some embodiments where security information is implemented, the keys used to validate a data packet having a route selector need not be associated with signatures of the sources 102 or senders and need not be associated with encryption. That is, additional keys independent of source 102 or sender identity can be used. Keys may also be independent of encryption. Moreover, as previously stated, multiple keys can be used and chained together via policies.

Figure 2:
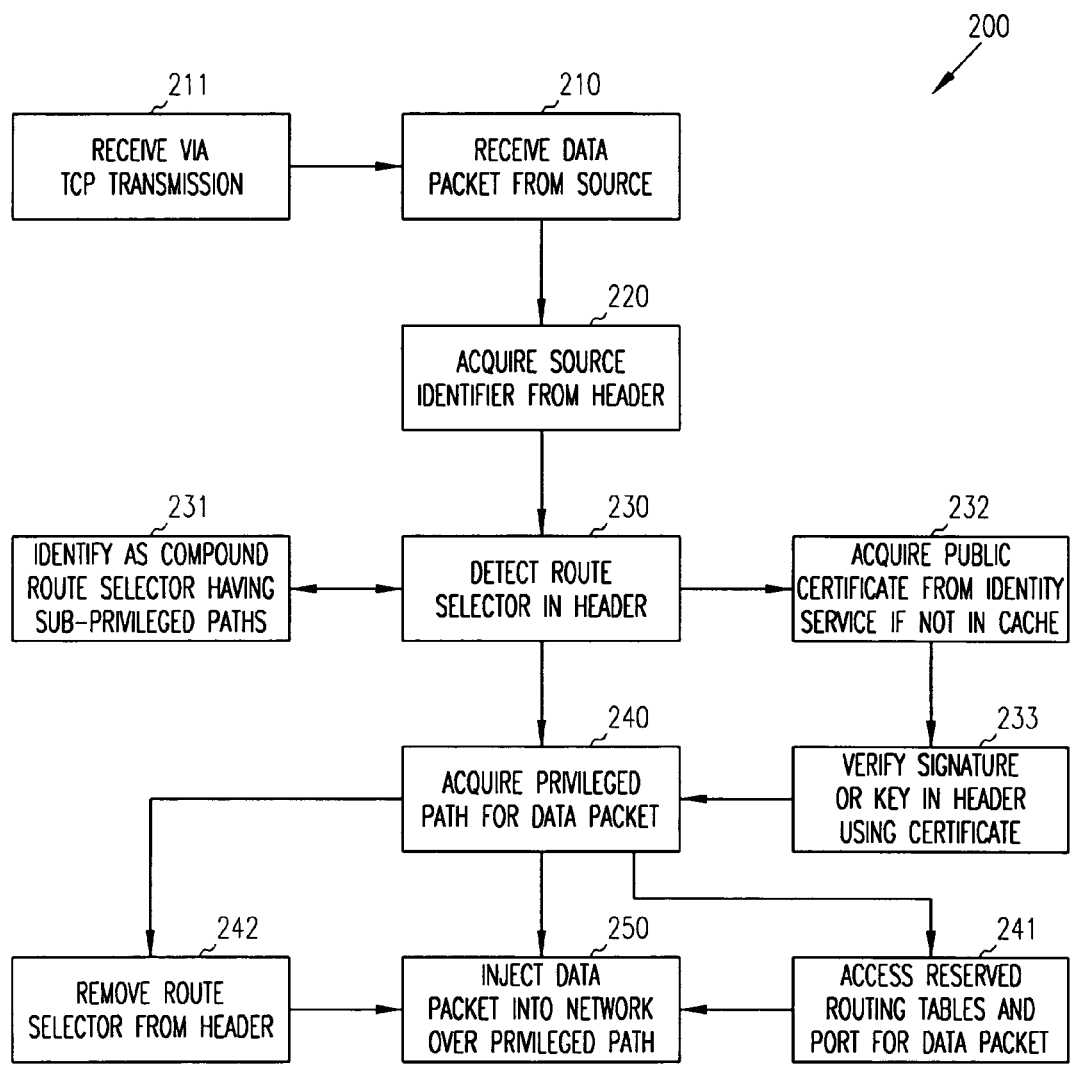
FIG. 2 is a flowchart of a method for injecting a data packet into a network over a privileged path, according to an example embodiment of the invention.

FIG. 2 is a flowchart of one method 200 for injecting a data packet into a network over a privileged path. The method 200 (herein after "injection service") is implemented in a machine-accessible and readable medium and is enabled to process over networks using conventional network connections, resources, arrangements, and protocols. In one embodiment, the injection service is the injection service 101 of FIG. 1 and the descriptions that follow more fully detail its processing and embodiments.

At 210, the injection service receives a data packet from a source associated with a desired network transaction of the source, where the source desires the data packet to be sent over a network to destination using a privileged path. In one embodiment, at 211, this packet is received from the source via a TCP/IP transmission. In other embodiments, the packet is received via any conventional or custom-developed protocol having modified metadata (header data) designed to achieve the teachings presented herein.

When the injection service receives the data packet, it acquires, at 220, a source identifier from the data packet header. This source identifier uniquely identifies the sender of the data packet and is included in traditional network protocols. At 230, the injection service detects a route selector that is also present in the header. The route selector is a novel data structure or string that is unobtrusively placed in the header by the source. By unobtrusive it is meant that the route selector is in a reserved or unused area of the data packet header that will not cause legacy network protocols to fail or recognize it during normal transmissions. For example, in one embodiment, the route selector data may be placed in the options segment of a TCP header.

It should also be noted that the route selector identifies or assist the injection service in resolving a privileged path for the received data packet. Moreover, a single header may include a string or multiple route selectors associated with multiple of sub-privileged paths. That is, route selector can be nested within a header and thus identified as a compound route selector, at 231.

In some embodiments, where trusted and secure transmissions are desired, the header may also include security information, such as signatures and keys. The decryption and validation of these signatures and keys may not be known a priori to the injection service. Thus, at 232, the injection service uses the source identifier of the source to contact an identity service for purposes of acquiring a public certificate of the source or sender. However, if, at 232, the public certificate of the source was previously cached, then the injection service can acquire the public certificate from cache and does not have to contact the identity service. Moreover, in some embodiments, the injection service does cache the public certificate of the source after it is initially acquired from the identity service. At 233, the public certificate permits the injection service to verify signatures of the source or sender and/or keys included with the security information present in the header. Again, if security information is being used and if it is not validated the data packet's request for a privileged path may be ignored and processed over a non-privileged path, or alternatively the network transaction associated with the requesting data packet may be discarded and not processed at all.

At 240, a privileged path is acquired for the detected and identified route selectors of the header. Acquisition can occur in a variety of manners. For example, the injection service may independently determine the proper privileged path based on policies, conditions, or events. Alternatively, there may be a mapping between the route selector and the privileged path that is resolved by reserved routing tables accessible to the injection service. Still further, the injection service may maintain or access a data store that maps route selectors, sources, and/or destinations to predefined privileged paths.

Once a privileged path is acquired, at 240, the injection service forwards or relays the data packet to a set of reserved routing tables and/or port(s), at 241, that process privileged paths for data packets. These routing tables and/or port(s) may be managed and set aside by the injection service permanently or when certain conditions warrant that they be set aside. Thus, the injection service can free up any reserved routing tables and/or port(s) when there are no privileged paths being processed and other routing tables and/or port(s) are loaded down on the device processing the injection service.

In some embodiments, for purposes of efficiency of processing the data packet, at 242, the injection service may strip the route selector(s) and any security information from the header before sending the data packet to the reserved tables and/or port or before placing the data packet on the network over the privileged path. The injection service may also strip a selective first portion of the privileged path, since it is the injection service that forwards the data packet over the link and node information associated with the first portion of the privileged path. This ensures that the data packet will not have additional data that increases the size of the packet which may impact its throughput through the network. Moreover, any intermediate nodes along the privileged path do not need to be aware of the privileged path or its processing which is achieved by the injection service. In this manner, legacy routers, proxies, hubs, bridges, gateways, and the like are not impacted and process normally once receiving the data packet and its privileged path from the injection service.

At 250, the injection service injects the data packet and its header into the network over the privileged path. That is, metadata or the header of the data packet includes the intermediate nodes of the privileged path which are needed to transmit, relay, or forward the data packet over the network to the destination.

In one embodiment, the privileged path may also include alternative privileged sub-paths, such that should any intermediate node of the original privileged path fail or one of its connections, the last intermediate node having the data packet can select and alternative sub-privileged path from the existing metadata of the data packet.

Figure 3:
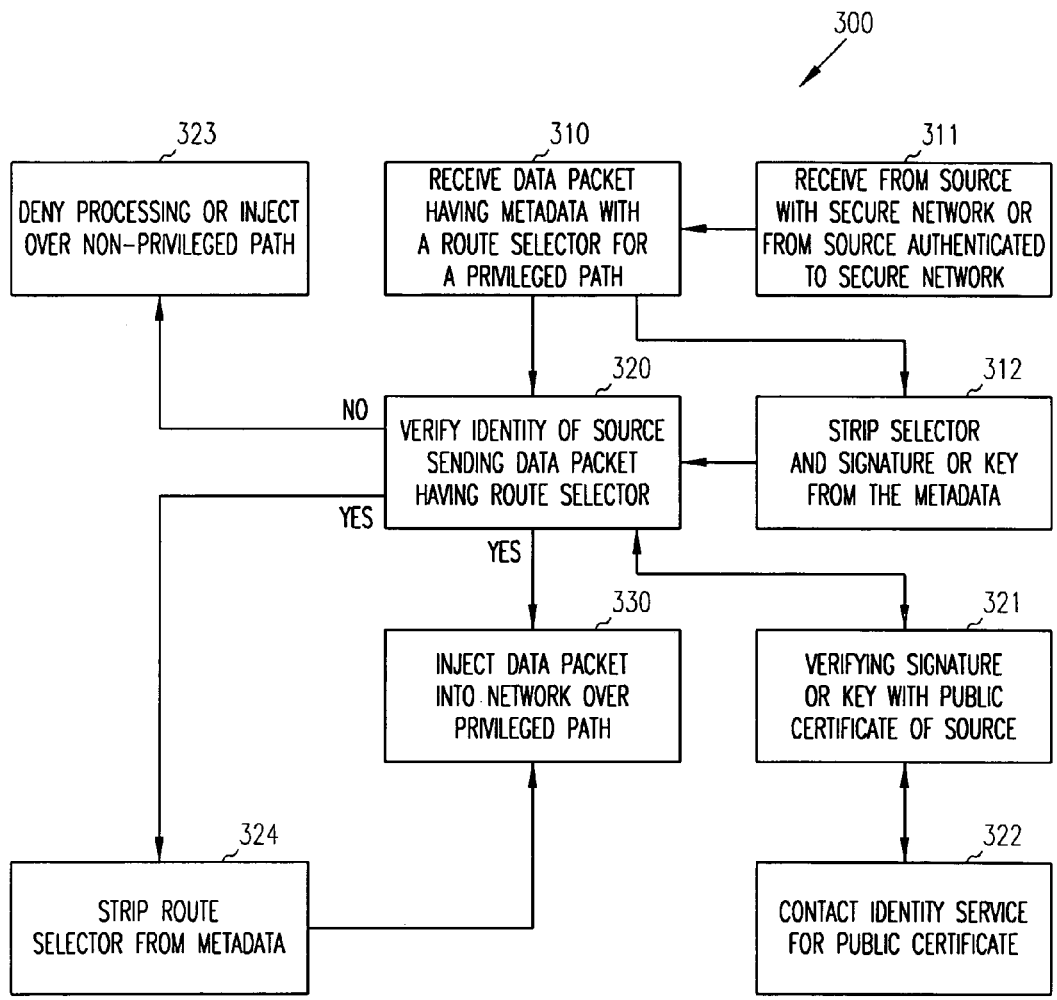
FIG. 3 is a flowchart of another method for injecting a data packet into a network over a privileged path, according to an example embodiment of the invention.

FIG. 3 is a flowchart of another method 300 for injecting a data packet into a network over a privileged path, according to an example embodiment of the invention. The method 300 (again referred to as injection service, herein and below) is implemented in a machine-readable and accessible medium and is accessible over networks using convention network arrangements, resources, and protocols. The injection service presents alternative embodiments and perspectives to the injection service described above with respect to method 200 of FIG. 2.

At 310, the injection service receives a data packet having metadata and a data payload. The payload is data which is associated with a network transaction originating from a source or sender and directed to a destination over a network. In one embodiment, the metadata is part of the data packet's header that is included with the data payload. In another embodiment, the metadata augments a data packet's header with additional information not included in the header. In one specific example embodiment, the metadata is a TCP header having conventional TCP fields for TCP header information, where the teachings presented herein are implemented in the options segment of that TCP header, so as to not impact legacy TCP processing associated with the data packet.

At 311, the data packet is received from a source or sender either from a source originating within a secure network having the injection service or from a source or sender that authenticates remotely to the secure network and becomes a temporary participant in the secure network. At 312, the route selector and signature and/or key security information are stripped from the metadata for purposes of subsequent processing defined herein and below. Moreover, a selective first portion of the privileged path is stripped from path, since this portion is processed by the injection service.

At 320, the identity of the source sending the data packet is verified. In one embodiment, verification may occur in the following manner. At 321, a signature of key of the source is verified with a public certificate of the source. That public certificate may be permanently housed within the environment (cache or storage) of the injection service or may be configured or manually supplied to the injection service. Alternatively, at 322, the injection service dynamically acquires the public certificate of the source by contacting and interacting with an identity service, in the manners described herein and above.

If the identity of the source is not verified, then, at 323, the injection service may deny processing of the data packet altogether or may elect or be configured based on policy to inject the data packet into the network over a non-privileged path associated with normal non-privileged path processing.

If the identity of the source is verified, then, in one embodiment, at 324, the route selector and any security information included within the metadata are stripped from the metadata of the data packet. This improves processing throughput through the network once the data packet is injected into the network over the privileged path by reducing the data packet size.

Once the identity of the source is verified, at 320, the data packet, at 330 can be injected into the network over the privileged path. In some embodiments, the route selector directly identifies the privileged path. In other embodiments, the injection service dynamically resolves the privileged path to be associated with the data packet.

Figure 4:
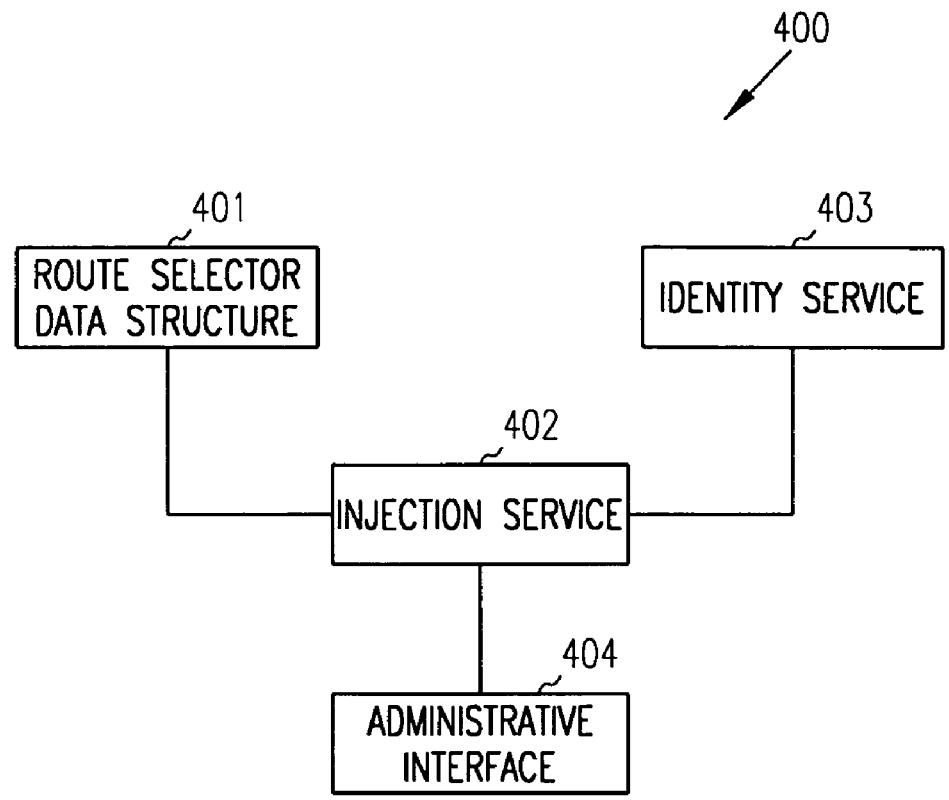
FIG. 4 is a diagram of a privileged routing system, according to an example embodiment of the invention.

FIG. 4 is a diagram of a privileged routing system 400, according to an example embodiment of the invention. The privileged routing system 400 is implemented in a machine-readable and accessible medium and is enabled to process within network arrangements, with network resources, and with network protocols. In one embodiment, among other things, the privileged routing system 400 implements the methods 200 and 300 of FIGS. 2 and 3.

The privileged routing system 400 includes a route selector data structure 401 and an injection service 402. Optionally, the privileged routing system 400 also includes an identity service 403, such as the one described herein and above. Moreover, in some embodiments, the privileged routing system 400 includes an administrative interface 404.

The route selector data structure 401 is data that assists in resolving or determining a privileged path for a data packet. The route selector data structure 401 is included in metadata of a data packet. In one embodiment, the route selector data structure 401 is included in the options segment of legacy TCP data packet headers. The route selector data structure 401 may include a one or more route selectors. That is, the route selector data structure 401 may have nested route selectors associated with nested, sub, and/or alternative privileged paths for a given data packet. The route selector data structure 401 is carried around with a data payload of a data packet. In this manner, a data packet includes the metadata having the route selector data structure 401 and a data payload.

In some embodiments, the metadata also includes security information, such as a key, chain of keys, and/or signatures. This security information may be encrypted with the identity of a source or sender that initially constructs the data packet. The security information permits the injection service 402 to verify the authenticity of the data packet having the route selector data structure 401.

The injection service 402 verifies the identity of the source or sender, acquires a privileged path for the data payload of the data packet based on the route selector data structure 401, and injects the data packet into a network over the privileged path. To perform verification, the injection service 402 may enlist the help of an identity service 403. Additionally, the injection service 402 may cache some or all of the security information or any public certificates or keys acquired from the identity service 403.

The identity service 403 performs a variety of useful features that may leverage various embodiments of the invention. Examples of specific identity services 403 were described above. More specifically, the identity service 403 may hold credentialing information for participants within network configurations that permit these participants to dynamically acquire techniques and identity information needed to interact with one another. In one embodiment, the identity service 403 also provides for the management and distribution of route selector data structures 401 to sources requesting the same for network transactions. In more embodiments, the identity service 403 provides the injection service 402 with decryption keys, or public certificates which can be used by the injection service 402 to verify any security information included in the metadata and associated with the source and the route selector data structure 401.

The injection service 402 may also be interfaced to an administrative interface 404. This permits the injection service 402 to be configured with policies, conditions, events, privileged paths, etc. The administrative interface 404 may also be used to define the route selector data structure 401 to the injection service 402.

The injection service 402 may maintain mappings between instances of the route selector data structures 401 and privileged paths. Alternatively, the injection service 401 may permit route selector data structures 401 that are representative of groups of available privileged paths. In these situations, the route selector data structure 401 may even be supplied within the metadata of the data packet as a wildcard value. Moreover, the injection service 402 may override based on policy specific requests for privileged paths that are identified by the route selector data structure 401. Overrides may be based on policy, configurable conditions, and/or configurable events.

In one embodiment, the injection service 402 may interact in a novel manner with the identity service 403 for purposes of informing a source or sender that keys are being changed for certain route selector data structures 401 or privileged paths. These changes are sent up to the identity service 403 and then sent down from the identity service 403 to the source or sender.

Once the injection service 402 verifies the identity of the source or sender, satisfies itself as to the authenticity of the route selector data structure, and resolves a privileged path, the injection service 402 injects the data packet into the network over the privileged path. In some cases, the route selector data structure 401 and any security information included within the metadata are stripped prior to injecting the data packet into the network over the privileged path.

Figure 5:
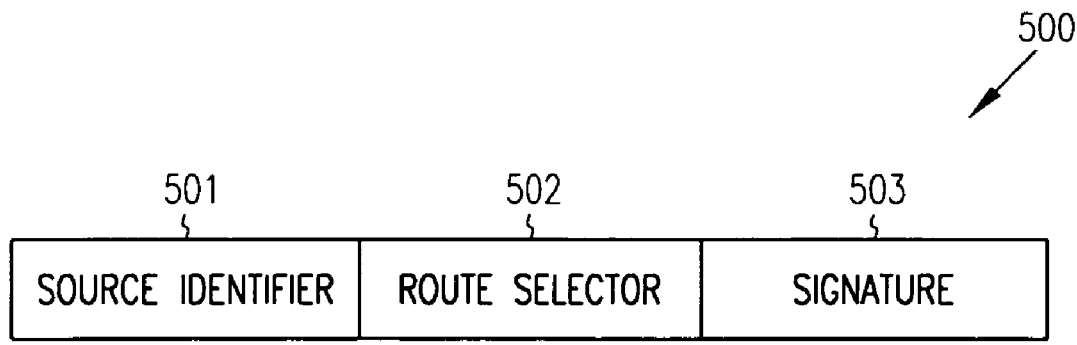
FIG. 5 is a diagram of data packet header for injecting a data packet into a network over a privileged path, according to an example embodiment of the invention.

FIG. 5 is a diagram of one data packet header 500 for injecting a data packet into a network over a privileged path, according to an example embodiment of the invention. The data packet header 500 is implemented in a machine-accessible or readable medium and is carried around at least initially with data packets involved in network transactions. In one embodiment, the data packet header represents the metadata described above with FIGS. 1-4. In this sense, the data packet header 500 facilitates the processing of the methods 100, 200, and the system 400.

The data packet header 500 includes a source identifier 501, a route selector data structure 502, and a signature 503. In some embodiments, the data packet header 500 also includes other traditional information carried with network packets, such as, but not limited to, sequence numbers for the packets, destination identifiers, acknowledgement numbers, port numbers, checksum values, offset values, and the like. In one embodiment, the route selector 502 and signature 503 are embedded within the options segment of a legacy TCP data packet header.

The source identifier 501 identifies a source or sender of a data packet. Again, the data packet includes a header or metadata having the data packet header 500, other information, and a data payload (the data the source wants to direct to a destination). The route selector 501, as described herein and above, it is data or a data structure that permits an injection service to resolve a privileged path for the data packet to traverse over a network to its destination.

The signature 503 may be an encrypted signature of the source which may be encrypted with a chain of keys, or a key independent of the source that is provided by the injection service via an identity service and then through the identity service to the source for use and placement within the data packet header 500. In some cases, the signature 503 is also independent of any particular encryption.

In one embodiment, the signature 503 is generated by the source using the source identifier 501, the route selector 502, and a 32-bit sequence number for the data packet provided by TCP/IP network protocols. In another embodiment, the signature 503 is encrypted by the source with a private key of the source and a public key of the injection service. In this latter embodiment, the injection service may hold the public key or certificate of the source or may dynamically acquire it as needed from the identity service.

The route selector 501 can include nested instances of other route selectors 501. These sub-route selectors 501 are associated with one or more additional sub-privileged or alternative paths for the data payload of the data packet within the network.

A source constructs the data packet header 500 and an injection service consumes the data packet header 500. The injection service verifies the source and route selector 502, resolves a privileged path for the network path, optionally removes the route selector 502 and the signature 503, and injects the data packet into the network over the resolved privileged path.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for injecting a data packet into a network over a privileged path, comprising:
    receiving a data packet;
    detecting a route selector associated with the data packet, wherein the route selector is a data structure that identifies a privileged path and that was affixed to the data packet by a source or sender of the data packet;
    acquiring the privileged path from the route selector included with the data packet, wherein the privileged path includes a plurality of selective nodes that are used to define the privilege path and traverse the data packet through a network to a destination, the privileged path is processed by the nodes as the data packet traverses the network, the nodes are identified in reserved routing tables and use a reserved communication port, and the nodes in combination with the reserved routing tables and the reserved communication port provide priority processing throughput for the data packet when it traverses the network to the destination; and
    injecting the data packet into the network over the privileged path.

2. The method of claim 1 further comprising, acquiring a public certificate of the source for the data packet from an identification service before injecting the data packet into the network.

3. The method of claim 2 further comprising, verifying a signature or key included in a header of the data packet in response to the public certificate before injecting the data packet into the network.

4. The method of claim 1 further comprising, removing the route selector from a header of the data packet before injecting the data packet into the network.

5. The method of claim 1, wherein receiving further includes receiving the data packet having a header from the source via a Transmission Control Protocol (TCP), and wherein an options segment of the header includes the route selector.

6. The method of claim 1, wherein detecting further includes identifying the route selector as a compound route associated with the privileged path which has a plurality of sub-privileged paths embedded therein or identifying the route selector as being associated with the privileged path and one or more alternative privileged paths.

7. A method for injecting a data packet over a privileged network, comprising:
- receiving a data packet having metadata that includes a route selector for a privileged path, wherein the route selector is a data structure that identifies the privileged path and that is included in the metadata of the data packet and is provided from a source that sends the data packet;
- verifying an identity of the source that sends the route selector with the data packet; and
- injecting the data packet into a network over the privileged path, when the identity of the source is verified, wherein the privileged path includes a plurality of selective nodes that are used to define the privilege path and traverse the data packet through the network to a destination, the privileged path is processed by the nodes as the data packet traverses the network, the nodes are identified in reserved routing tables and use a reserved communication port, and the nodes in combination with the reserved routing tables and the reserved communication port provide priority processing throughput for the data packet when it traverses the network to the destination.

8. The method of claim 7, wherein receiving further includes:
- stripping a source identifier from the metadata; and
- stripping a signature or key from the metadata.

9. The method of claim 7, wherein verifying further includes verifying a signature or a key with a public certificate of the source.

10. The method of claim 9 further comprising at least one of:
- dynamically contacting an identity service to acquire the public certificate of the source; and
- acquiring a previously retained public certificate of the source from at least one of cache and storage.

11. The method of claim 7 further comprising, stripping the route selector from the metadata before injecting the data packet into the network.

12. The method of claim 7, wherein receiving further includes receiving the data packet and metadata from a source within a secure network, wherein the source is a trusted entity to the processing of the method.

13. The method of claim 12, wherein receiving further includes receiving the data packet and metadata from a source that previously authenticated itself to the secure network via an insecure network thereby entering the secure network.

* * * * *